May 30, 1961 P. JUODIKIS 2,986,039
GRADUATE FOR AUTOMATIC DISTILLATION APPARATUS
Filed April 14, 1958
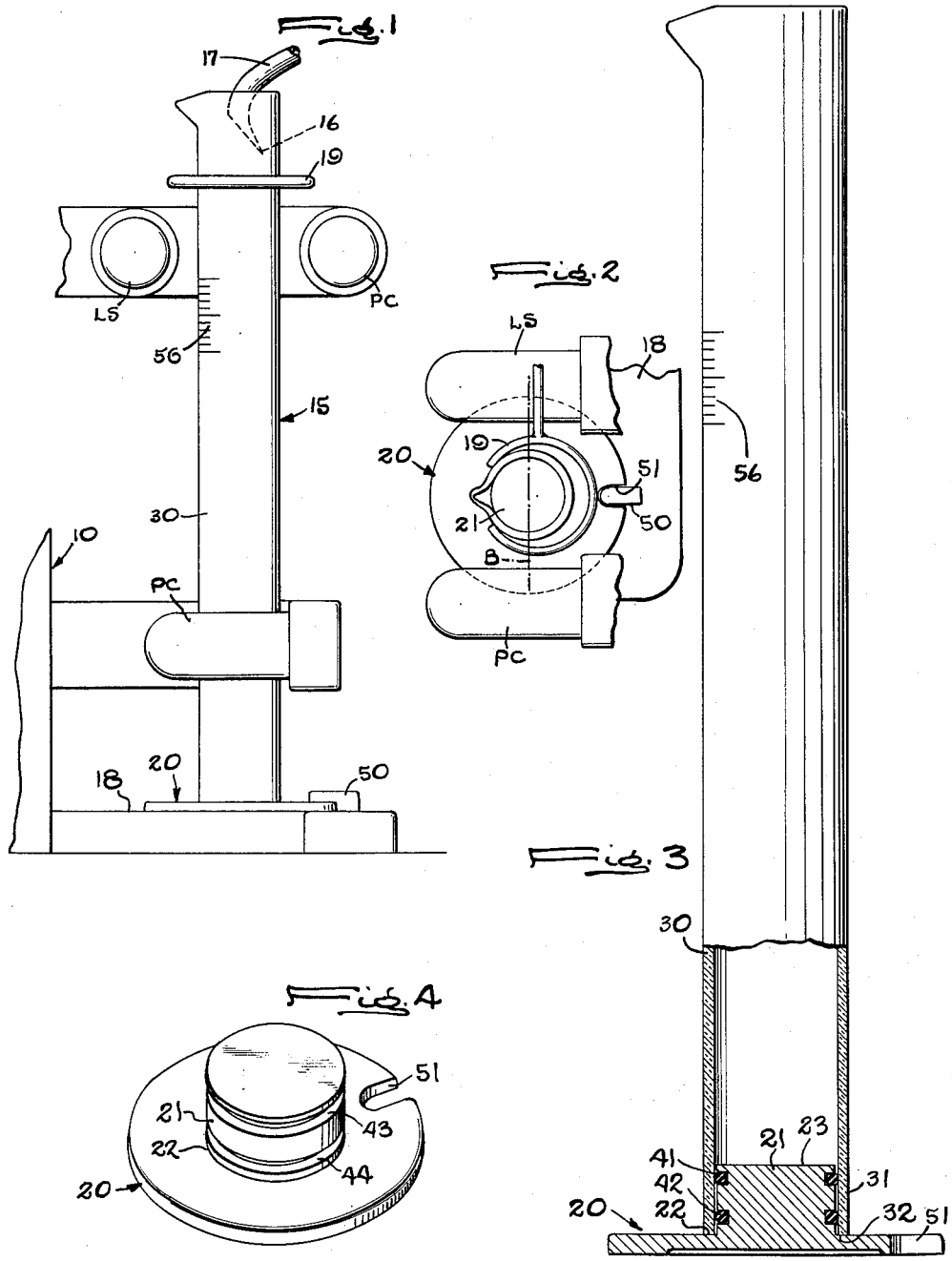
INVENTOR
Peter Juodikis
Carlson, Pitzner, Hubbard + Wolfe
ATTORNEY United States Patent Office 2,986,039
Patented May 30, 1961

2,986,039
GRADUATE FOR AUTOMATIC DISTILLATION APPARATUS

Peter Juodikis, Chicago, Ill., assignor to Precision Scientific Company, Chicago, Ill., a corporation of Illinois Filed Apr. 14, 1958, Ser. No. 728,229

2 Claims. (Cl. 73—427)

The present invention relates generally to automatic distillation apparatus and more particularly to a fluid receiving graduate particularly adapted for use in such apparatus.

It is the primary aim of the present invention to provide a novel, extremely accurate graduate, which has a precisely uniform inner bore, walls of uniform thickness from bottom to top, and which exhibits consistent optical accuracy from point to point along its length. It is a more specific object to provide a graduate in which the volume varies with the height of the fluid column with a high degree of precision and in which the height is subject to accurate measurement by optical means, thereby causing the graduate to be ideally suited for use in an automatic recording distillation apparatus or the like.

Moreover, it is an object of the invention to provide a novel graduate having the above characteristics which is unusually economical to manufacture in that no specially formed precision glass parts are utilized and no precision assembly operations are required. A related object is to provide a graduate as described above made up of a length of standard tubing and an easily and inexpensively formed base, which can be quickly and easily assembled without special skill or equipment.

It is also an object to provide a graduate of the above type which effectively resists both accidental shock damage and the adverse effects of unequal heating. It is a collateral object to provide such a graduate having only one part subject to accidental breakage and that part being adapted for quick, economical replacement by the operator of the apparatus who need not be skilled in glass forming techniques.

It is a further object to provide a graduate as characterized above, which is formed to facilitate its accurate placement and register in the apparatus in which it is used. It is a more specific object in this invention to provide a graduate having surfaces on its base which mate with surfaces on the apparatus but in which there is no danger of chipping or other damage as a result of repeated or careless use.

Other objects and advantages of the invention will become apparent upon reading the attached detailed description in which:

Figure 1 is an elevational view of a graduate constructed in accordance with the invention mounted in automatic distillation apparatus of which only a portion is shown;

Fig. 2 is a top view of the graduate and apparatus shown in Fig. 1;

Fig. 3 is a side view partially in section of the graduate shown in Fig. 1; and

Fig. 4 is a perspective view of the base of the graduate shown in Fig. 3.

While the invention will be described in connection with a preferred embodiment, it will be understood that I do not intend to limit the intention to that embodiment. On the contrary, I intend to cover all alternatives, modifications and equivalents as may be included within the spirit and scope of the invention as defined by the appended claims.

Turning now to Fig. 1, there is shown a portion 10 of an automatic distillation apparatus of a type known in the art. For collecting the distillate, a graduate 15, constructed in accordance with the present invention, is mounted in position beneath the discharge end 16 of a fluid delivery tube 17. The graduate rests on a supporting surface 18 and is held in position by a clamp ring 19.

In accordance with the present invention, the graduate 15 includes a base, having a short upwardly extending pedestal, and a length of precision bore tubing in telescoping relation with the pedestal and sealed firmly thereto by a spaced pair of resilient rings interposed between the tubing and the pedestal. In the preferred embodiment, a base 20 is provided having a generally disk-like configuration and an upstanding pedestal 21 formed integrally therewith. The pedestal is generally cylindrical in outer configuration and is surrounded at its juncture with the base 20 by a flat upper seating surface 22. The base is formed of durable, non-chipping material, preferably metal.

To provide a flat inner bottom surface, or zero level, for the graduate 15, the upper surface 23 of the pedestal 21 is flat and disposed in a plane parallel to the upper seating surface 22 on the base 20. So as to avoid optical distortions such as light reflections, the base 20 and the pedestal 21 are formed with a dull black surface finish. In a practical case, it has been found advantageous to form the base and its pedestal of dull black, anodized aluminum.

Forming the sidewalls of the graduate 15 is a length of precision bore glass tubing 30 having its lower end portion 31 telescoped over the pedestal 21. The lower edge 32 of the tubing 30 is ground square so that it lies in a plane at right angles to the tube axis, with the result that the edge 32 fits flatly against the upper seating surface 22 when the tube and base are in proper assembled relation. It will also be noted that this construction disposes the upper surface 23 of the pedestal, which forms the bottom of the graduate, perpendicularly to the tube axis.

Joining the base 20 and the tube 30 are a pair of resilient O-rings 41 and 42 snugly interposed between the end portion 31 of the tube 30 and the sidewall of the pedestal 21. Preferably, the rings 41, 42 are fitted into peripheral grooves 43, 44 respectively, formed in the sidewall of the pedestal. The uppermost ring 41 is also preferably located just beneath the upper surface 23 of the pedestal so as to minimize the slight space between the tube 30 and the upper portion of the pedestal sidewall.

It is important to note that while only a single resilient sealing ring would be required to provide an adequate fluid seal between the tube 30 and the base 20, by providing a pair of spaced rings 41, 32, vertical rigidity is given to the tube with respect to the base. Therefore, when the graduate is handled and positioned in the apparatus, the bottom edge 32 of the tube remains firmly seated on the flat upper sealing surface 22 of the base and the tube axis remains perpendicular to the surface 23 forming the bottom of the graduate.

As a feature of the invention, the graduate base is formed so as to mate with a locating member comprising a part of the apparatus in which the device is used. In this way the graduate can be quickly and accurately registered in operating position relative to the apparatus. In the illustrated embodiment the apparatus locating member takes the form of a rib 50, and the graduate base 20 is provided with a peripheral notch 51 dimensioned to embrace the rib 50 when the graduate is in proper operating position within the distillation apparatus.

To fully appreciate the importance of precisely locating the graduate 15 within the distillation apparatus 10, those skilled in the art will recall the operating sequence employed in conventional apparatus of this type. After the first drop of distillate falls into the graduate from the delivery tube 17, the graduate is tilted by suitable means approximately ⅛ of an inch so that succeeding drops from the delivery tube will fall against the sidewall of the graduate. This is necessary to cause the fluid to slide down the side wall so that the continuing flow of fluid does not disturb the meniscus, and, as is known in the art, a light source LS and photocell PC are provided so that a light beam B passes through the center of the graduate for continuous measurement of the liquid level.

Considering the above mode of operation it can be readily seen why accuracy in positioning the graduate 15 within the apparatus 10 is essential. It will be appreciated that the provision of the positioning rib 50 and the cooperating notch 51 greatly facilitates accurate and rapid registering of the graduate without special difficulty. In the preferred illustrated embodiment, the tube 30 is also provided with a series of graduation lines 56 inscribed on the outer side wall and proper orientation by the engaging rib 50 insures that such indicia do not interfere with free straight passage of the light beam. The graduations may be linear so that individual calibration is not necessary to achieve high accuracy. And since the height of the pedestal 21 can be accurately determined and maintained standard from unit to unit, the beginning point of the graduations may be accurately standardized.

It may be seen that assembly of the graduate 15 is quite simple. It is sufficient to position the resilient rings 41, 42 in their respective grooves 43, 44, and then slip the tube 30 over the pedestal into flat seating engagement with the upper base seating surface 22. Since the engagement between the tube and the base is in full view of the person assembling the graduate, it may be readily visually determined when the parts are in proper relationship.

The metal base 20 being preferably formed of metal, it is, of course, not subject to accidental breakage or chipping. This is particularly important when it is appreciated that the locating notch 51 is subject to considerable abuse. A glass part having such at notched configuration would be almost immediately damaged and the accuracy of positioning thus impaired. In the event that the glass tube 30 is broken, all that is necessary is to substitute another similar tube on the same base 20 so that the entire graduate need not be discarded.

The ready assembly and disassembly of the present graduate also permits rapid and complete cleaning. By separating the tube from the base each part is easily accessible. The tubes, moreover, may be inexpensively packed and shipped more safely than conventional graduates.

It will also be understood by those familiar with this art, that precision bore tubing from which the tube 30 is formed, is a standard product readily available, and that therefore the graduate 15 utilizes no expensive, specially formed, precision glass parts.

I claim as my invention:

1. A graduate for use as a collecting and measuring vessel in an automatic distillation apparatus having a locating member for positioning a graduate, comprising, in combination, a disk-like base, said base having a peripheral notch proportioned for embracing said apparatus locating member, a short cylindrical pedestal extending upwardly at right angles from said base, a length of precision bore glass tubing having one end portion loosely telescoped over said pedestal and abutting said base, and a pair of resilient sealing rings interposed snugly between said pedestal and said tubing end portion, said rings being spaced along said pedestal so as to give vertical rigidity to said tubing on said base, said notch being effective for precisely locating said base in said apparatus incident to embracing said member with said notch and said vertical rigidity of the tubing assuring that the transparent liquid holding portion of the graduate is precisely positioned in the apparatus incident to locating said base.

2. A graduate for use as a collecting and measuring vessel in an automatic distillation apparatus having a locating member for positioning a graduate, comprising, in combination, a disk-like base, said base having a peripheral notch proportioned for embracing said apparatus locating member, a length of precision bore glass tubing having one end portion abutting said base and being firmly mounted thereon, and a resilient sealing ring interposed between said base and said tubing end portion to give vertical rigidity to said tubing on said base, said notch being effective for precisely locating said base in said apparatus incident to embracing said member with said notch and said vertical rigidity of the tubing assuring that the transparent liquid holding portion of the graduate is precisely positioned in the apparatus incident to locating said base.

References Cited in the file of this patent

UNITED STATES PATENTS

| | | |
|---|---|---|
| 880,505 | Bryers | Mar. 3, 1908 |
| 1,399,394 | Mond | Dec. 6, 1921 |
| 1,832,436 | Wagenseller | Nov. 17, 1931 |
| 2,601,783 | Rouse et al. | July 1, 1952 |
| 2,690,080 | Rich | Sept. 28, 1954 |

FOREIGN PATENTS

| | | |
|---|---|---|
| 326,664 | Germany | Oct. 1, 1920 |